United States Patent
Bierweiler et al.

(10) Patent No.: US 12,429,386 B2
(45) Date of Patent: Sep. 30, 2025

(54) TEMPERATURE MEASURING DEVICE FOR NON-INVASIVE TEMPERATURE MEASUREMENT, TEMPERATURE MEASURING SYSTEM AND COMPUTER PROGRAM PRODUCT

(71) Applicant: Siemens Aktiengesellschaft, Munich (DE)

(72) Inventors: Thomas Bierweiler, Stutensee (DE); Stefan Von Dosky, Karlsruhe (DE); Wolfgang Ens, Linkenheim (DE); Markus Hilsendegen, Karlsruhe (DE); Valentin Rigoni, Wintershouse (FR); Tim Scherer, Karlsruhe (DE); Ralf Huck, Großkrotzenburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/702,851

(22) PCT Filed: Aug. 11, 2022

(86) PCT No.: PCT/EP2022/072580
§ 371 (c)(1),
(2) Date: Apr. 19, 2024

(87) PCT Pub. No.: WO2023/066541
PCT Pub. Date: Apr. 27, 2023

(65) Prior Publication Data
US 2025/0003808 A1  Jan. 2, 2025

(30) Foreign Application Priority Data
Oct. 22, 2021 (DE) .......................... 102021211940.9

(51) Int. Cl.
*G01K 1/16* (2006.01)
*G01K 1/143* (2021.01)
(Continued)

(52) U.S. Cl.
CPC ................ *G01K 1/16* (2013.01); *G01K 1/143* (2013.01); *G01K 3/14* (2013.01); *G01K 13/02* (2013.01)

(58) Field of Classification Search
CPC ............ G01K 1/16; G01K 1/143; G01K 3/14; G01K 13/02
See application file for complete search history.

(56) References Cited

U.S. PATENT DOCUMENTS 4,061,029 A * 12/1977 Fletcher .................... G01P 5/10
73/180
4,538,925 A * 9/1985 Zgonik ................... G01K 17/12
374/E17.01

(Continued)

FOREIGN PATENT DOCUMENTS

DE  4244189  7/1994
DE  19802296  3/1999

(Continued)

OTHER PUBLICATIONS

PCT International Search Report dated Nov. 21, 2022 based on PCT/EP2022/072580 filed Aug. 11, 2022.

(Continued)

*Primary Examiner* — Laura Martin
*Assistant Examiner* — Philip L Cotey
(74) *Attorney, Agent, or Firm* — Cozen O'Connor

(57) ABSTRACT

A temperature measuring system comprising temperature measuring device, a computer program product suitable for simulating an operating behavior of such a temperature measuring device, and a temperature measuring device for (Continued)

non-invasively measuring a temperature of a medium in a pipe includes a sensor holder and a heat coupling element configured for producing a heat conducting path from a wall of the pipe to a first temperature sensor, wherein the heat coupling element is configured for adjusting the heat conducting path in a layered structure with components composed of different materials where, alternatively or supplementarily, the heat coupling element has an arcuate profile at least sectionally for the purpose of axially reversing the heat conducting path.

17 Claims, 2 Drawing Sheets

(51) Int. Cl.
*G01K 3/14* (2006.01)
*G01K 13/02* (2021.01)

(56) References Cited

U.S. PATENT DOCUMENTS

| | | | | |
|---|---|---|---|---|
| 5,064,604 | A * | 11/1991 | Barton | G21C 17/032 376/245 |
| 5,527,111 | A * | 6/1996 | Lysen | G01K 1/16 374/E1.019 |
| 6,834,993 | B1 * | 12/2004 | Staniforth | G01K 1/143 374/E1.019 |
| 9,735,451 | B2 * | 8/2017 | Kim | H01M 10/486 |
| 10,317,295 | B2 * | 6/2019 | Rud | G01K 7/16 |
| 11,029,215 | B2 * | 6/2021 | Cavanaugh | G01K 1/146 |
| 11,073,429 | B2 * | 7/2021 | Rud | G01K 13/02 |
| 2015/0185085 | A1 * | 7/2015 | Converse | G01K 1/143 374/100 |
| 2016/0047697 | A1 * | 2/2016 | Decker | G01K 1/143 374/179 |
| 2017/0023415 | A1 * | 1/2017 | Decker | G01K 1/143 |
| 2017/0074730 | A1 * | 3/2017 | Rieder | G01K 7/427 |
| 2017/0212065 | A1 * | 7/2017 | Rud | G01K 1/143 |
| 2017/0286572 | A1 * | 10/2017 | Hershey | B64F 5/60 |
| 2019/0207351 | A1 * | 7/2019 | Morinari | H01R 33/76 |
| 2020/0225096 | A1 * | 7/2020 | Ude | G01K 7/427 |
| 2020/0271495 | A1 * | 8/2020 | Umkehrer | G01F 15/006 |
| 2022/0163399 | A1 * | 5/2022 | Doya | F16K 27/003 |
| 2023/0314241 | A1 * | 10/2023 | Gebhardt | G01K 7/42 374/1 |

FOREIGN PATENT DOCUMENTS

| | | |
|---|---|---|
| DE | 10227454 | 5/2003 |
| DE | 202015103863 | 8/2015 |
| DE | 102014103430 | 9/2015 |
| DE | 102017120941 | 3/2019 |
| WO | 2017131546 | 8/2017 |
| WO | 2019063519 | 4/2019 |

OTHER PUBLICATIONS

International Preliminary Examination Report dated Sep. 21, 2023 based on PCT/EP2022/072580 filed Aug. 11, 2022.

* cited by examiner

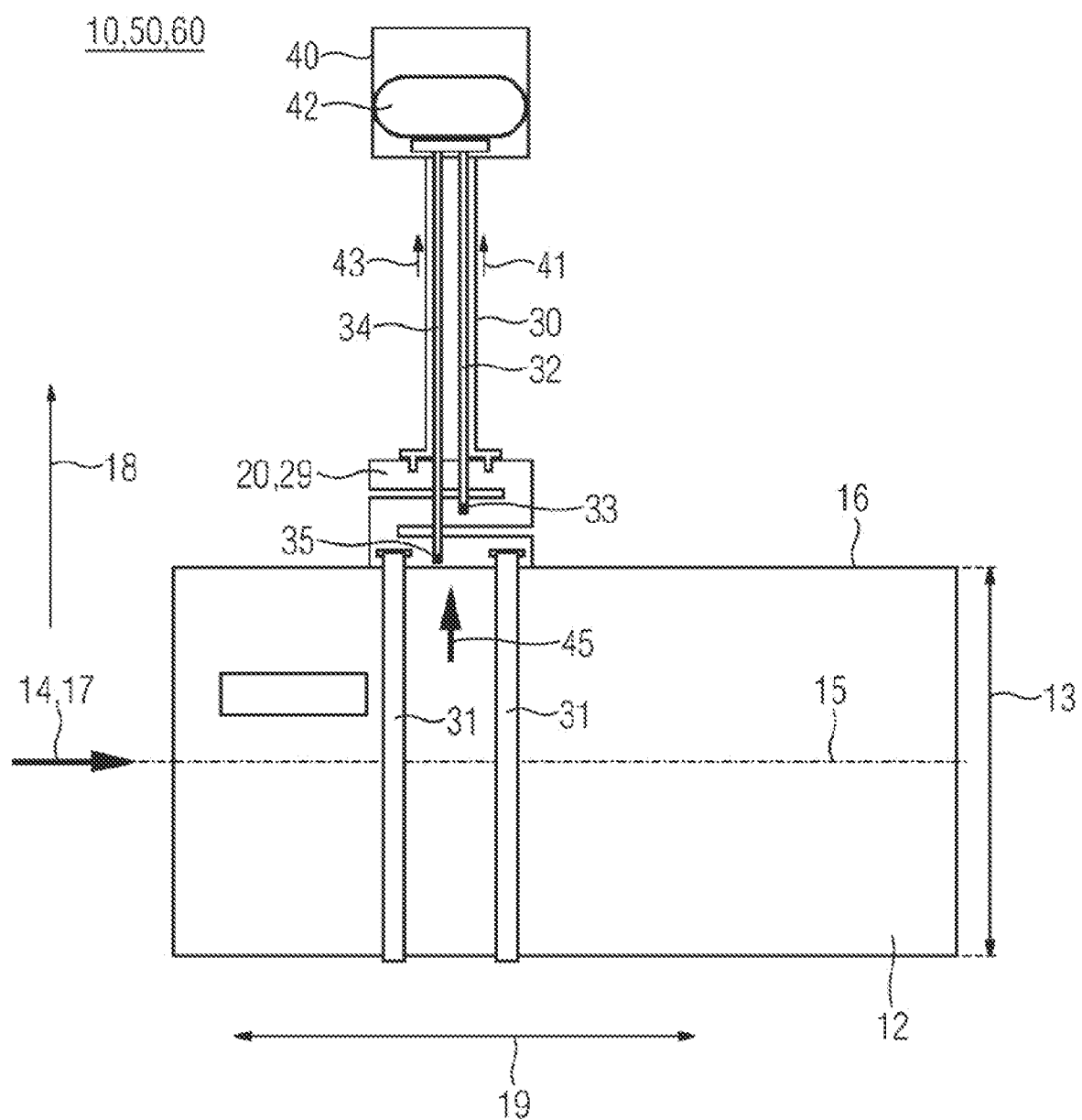

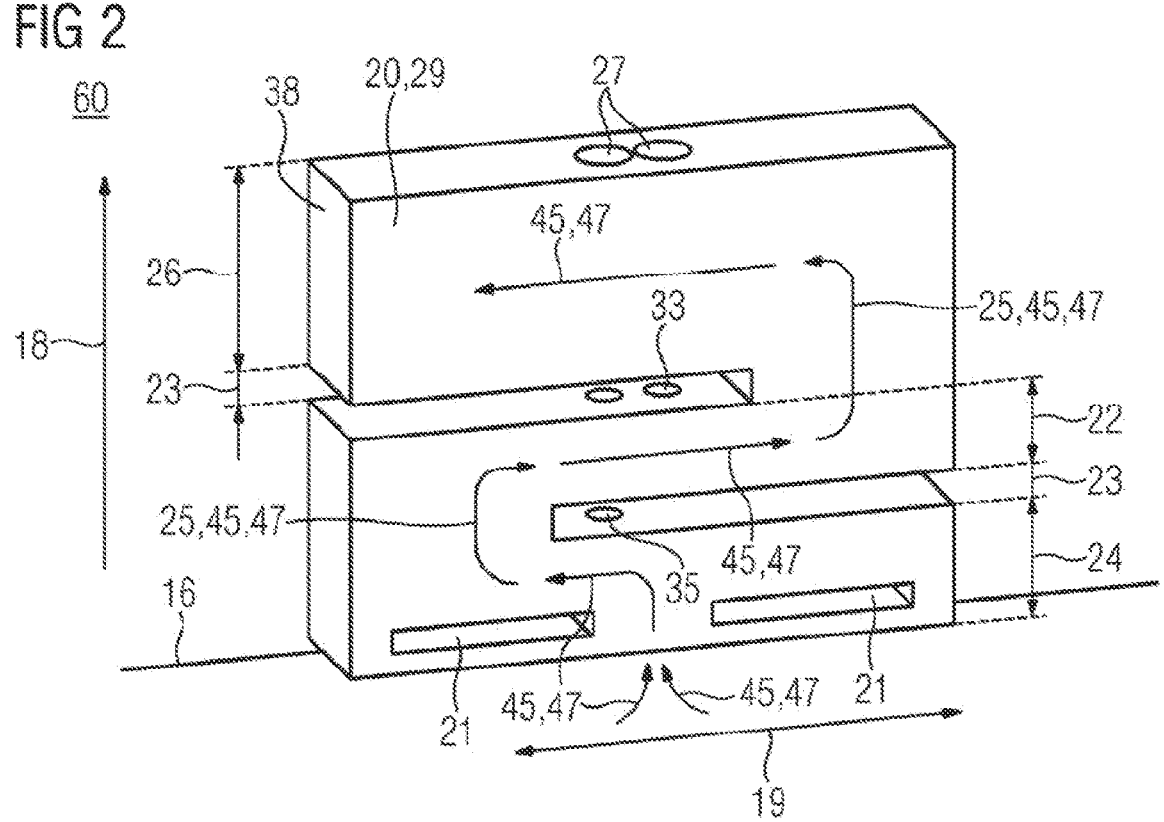
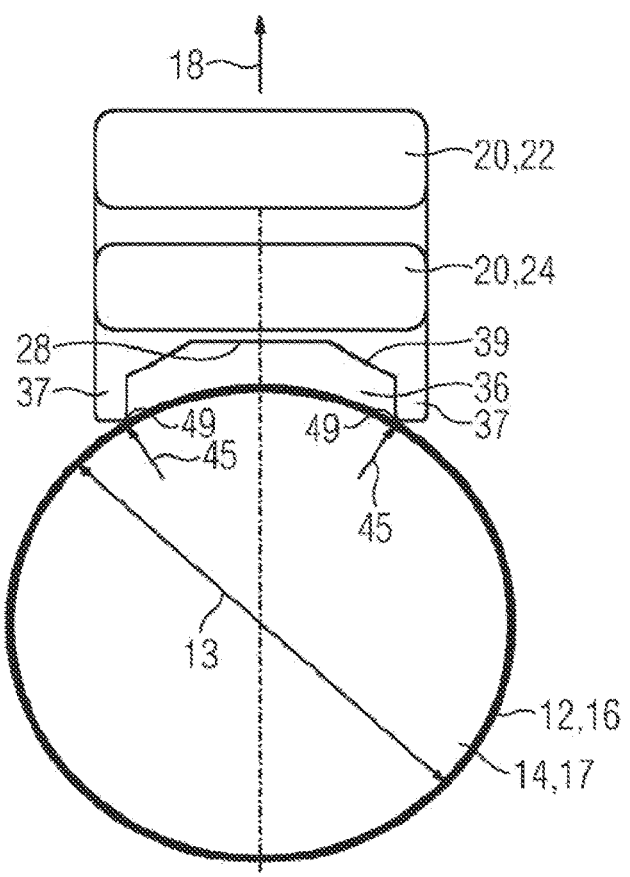

TEMPERATURE MEASURING DEVICE FOR NON-INVASIVE TEMPERATURE MEASUREMENT, TEMPERATURE MEASURING SYSTEM AND COMPUTER PROGRAM PRODUCT

CROSS-REFERENCE TO RELATED APPLICATIONS

This is a U.S. national stage of application No. PCT/EP2022/072580 filed 11 Aug. 2022. Priority is claimed on German Application No. 10 2021 211 940.9 filed 22 Oct. 2021, the content of which is incorporated herein by reference in its entirety.

BACKGROUND OF THE INVENTION

1. Field of the Invention

The invention relates to a temperature measuring device for non-invasive temperature measurement, a temperature measuring system having such a temperature measuring device, and a computer program product for simulating the operating behavior of such a temperature measuring device.

2. Description of the Related Art

WO 2019/063519 A1 discloses a temperature measuring device that can be installed on a pipe. The temperature measuring device comprises two temperature sensors that are to be installed with their measuring tips at different radial distances from a wall of the pipe. Here, the measuring tips of the temperature sensors are accommodated in an insulating layer to minimize errors caused by heat losses.

WO 2017/131546 A1 discloses a temperature measuring device comprising two temperature sensors that generate separate measured values from which the temperature of a medium in a pipe can be calculated. Herein, thermal resistance values of different components are taken into account.

Non-invasive temperature measurements are increasingly being used in different areas of application, such as process industry companies. Here, the aim is to achieve increasing measuring accuracy, reliability and cost efficiency. Ease of installation is also required to enable existing systems to be retrofitted quickly.

SUMMARY OF THE INVENTION

It is an object of the invention to provide an improved temperature measuring device.

This and other objects and advantages are achieved in accordance with the invention by a temperature measuring device that is embodied for non-invasively measuring a temperature of a medium located in a pipe. The medium can, for example, be a liquid, a gas, a vapor, a mixture thereof, or a viscous material. Herein, the direction in which the pipe extends defines an axial direction. The temperature measuring device comprises a sensor holder which, in an installed state, is attached to a heat coupling element. The heat coupling element is structured to establish thermally conductive contact with a wall of the pipe. The heat coupling element is itself at least partially formed as thermally conductive and is suitable for defining a heat conduction path. The temperature measuring device furthermore has a first temperature sensor configured to provide a first measured temperature value. For this purpose, the first temperature sensor can be connected to the heat coupling element in a thermally conductive manner. The heat coupling element is configured to establish a heat conduction path from the wall of the pipe to the first temperature sensor. Here, the heat conduction path is a section in and/or on the heat coupling element along which a heat flow, which flows from the wall of the pipe into the heat coupling element, substantially propagates. Thermal losses, for example, from the heat coupling element to the environment, are not attributable to the heat conduction path from the wall to the first temperature sensor. Such thermal losses can, for example, be minimized or kept constant by an insulating layer.

In accordance with the invention, the heat coupling element is configured to adjust the heat conduction path from the wall to the first temperature sensor. Adjustment comprises the structural specification of a thermal resistance of the heat conduction path or its thermal conductivity by the heat coupling element.

In accordance with the invention, the heat coupling element is configured to reverse the heat conduction path axially, i.e., in relation to the axial direction. The axial reversal causes the heat conduction path to extend in substantially opposite directions at different positions. For this purpose, the heat coupling element has an arcuate profile at least sectionally. Here, the profile can in particular be understood as a shape of the heat coupling element from a side view. Axial deflection is achieved by the heat conduction path extending along sections of the profile, i.e., substantially passing through them along a constructive main axis. Compared to conventional solutions, this makes it possible to extend the heat conduction path between the wall of the pipe and the first temperature sensor. Consequently, the thermal resistance along the heat conduction path can be adjusted to allow precise measurement of the temperature of the medium. In particular, the heat conduction path can be extended in the radial direction to save space by extending the heat coupling element in the axial direction. At the same time, the extension of the heat conduction path achieved in this way can be particularly compact due to the arcuate profile.

In one embodiment of the invention, the heat coupling element can be formed in a layered configuration with components composed of different materials. Accordingly, the components, which are arranged in layers, in particular in a radial direction, have different thermal conductivities and define heat transfer between them in pairs. Along the heat conduction path, at least one heat transfer occurs between the wall of the pipe and the first temperature sensor within the heat coupling element between its components, which are arranged in a layered configuration. As a result, overall, the heat conduction path from the wall of the pipe to at least the first temperature sensor can be adjusted in terms of thermal conductivity. Thermal conductivity adjusted in this way allows precise non-invasive measurement of the temperature of the medium.

In a further embodiment of the temperature measuring device, the heat coupling element has a C-shaped profile, an S-shaped profile, a Z-shaped profile or a meander profile. A C-shape is simple and cost-efficient to produce. An S-shaped profile offers a substantial extension of the heat conduction path and at the same time is particularly compact. A Z-shaped profile offers increased mechanical stability, in particular against stresses in a radial direction of the pipe. A meander profile in turn offers a further increase in the extension the heat conduction path. The disclosed temperature measuring device has a heat coupling element, which can thus be produced in a large number of variants while offering the technical advantages of the invention. The disclosed temperature measuring device can therefore easily be adjusted for a wide range of applications.

In addition, the temperature measuring device can have a second temperature sensor embodied to provide a second measured temperature value. Like the first temperature sensor, the second temperature sensor can be connected to the heat coupling element in a thermally conductive manner. This also creates a heat conduction path from the wall of the pipe to the second temperature sensor in the heat coupling element in installed state. As a result, there is also a heat conduction path between the first temperature sensor and the second temperature sensor, which substantially extends through the heat coupling element. The first and second temperature sensor can be installed at a distance from one another. As a result, an extended heat conduction path with a defined thermal resistance can be formed between them. In particular, the thermal resistance can be configured to accelerate the response of the temperature measuring device to a change in the temperature of the medium. Likewise, the heat coupling element can be configured to minimize overshooting during non-invasive measurement of the temperature in the medium. Here, in a mechanical analogy, the thermal resistance defined by the heat coupling element acts as a resistance element and damping element. The joint processing of the first measured temperature value from the first temperature sensor and the second measured temperature value from the second temperature sensor enables the temperature of the medium to be ascertained with increased accuracy.

Furthermore, the first temperature sensor can be arranged in a first axial section of the heat coupling element for acquiring the first measured temperature value. Correspondingly, the second temperature sensor can be arranged in a second axial section of the heat coupling element for acquiring the second measured temperature value. Here, the first or second axial section are sections of the heat coupling element that each extend substantially in the axial direction, i.e., along the pipe. In the first or second axial section, the heat conduction path extends substantially in the axial direction, i.e., parallel to the pipe. The first and the second axial sections can be formed at a distance from one another in the radial direction. The first and second axial section of the heat coupling element can belong to the at least sectionally arcuate profile. As a result, the heat flow along the heat conduction path first reaches the second temperature sensor and then the first temperature sensor. Thus, between the first and second temperature sensor, there is a defined thermal resistance that allows a precise measurement of the temperature of the medium. The claimed temperature measuring device can also have a third temperature sensor. This enables the mode of operation of the first and second temperature sensors to be reproduced and thus the technical advantages outlined to be achieved to a greater extent.

In a further embodiment of the temperature measuring device, the heat coupling element can be at least partially made of a material that has a temperature-related thermal conductivity gradient value of up to 0.025 (W/(m*K))/° C. The higher the thermal conductivity gradient value, the more sensitive the measurement of the temperature of the medium. Conversely, a temperature-related thermal conductivity gradient that has a lower value offers a simple and, at the same time, precise measurement over a wide temperature range. Here, a temperature-related thermal conductivity gradient of this kind can, for example, be present in a range of 0° C. to 1200° C. for the first and/or second measured temperature value. In this way, the disclosed temperature measuring device achieves a further increase in measuring accuracy.

Further, the heat coupling element of the disclosed temperature measuring device can be made of stainless steel. Stainless steel has a relatively low thermal conductivity for a metallic material. Accordingly, this results in increased thermal resistance for the heat conduction path to the first or second temperature sensor in each case. Similarly, there is also increased thermal resistance between the first and second temperature sensor. In combination with the temperature-related thermal conductivity gradient of stainless steel, this results in increased measuring accuracy for the first or second measured temperature value. Thus, the disclosed temperature measuring device offers a wide range of possible applications. In addition, stainless steel has increased corrosion resistance and heat resistance, so that the disclosed temperature measuring device is sufficiently robust and durable, even for applications with demanding ambient conditions.

Furthermore, a side of the heat coupling element facing the pipe can be configured as a dovetail. Herein, the side facing the pipe has a recess in a central region so that, in installed state, the heat coupling element substantially rests on two lateral support sections on the pipe that substantially extend in the axial direction. For this purpose, the recess has a trapezoidal profile, for example. As a result, the thermally conductive contact between the wall of the pipe and the heat coupling element substantially comprises two line contacts. As a result, there is a substantially constant thermally conductive contact between the wall and the heat coupling element over different pipe diameters. As a result, the disclosed temperature measuring device offers an exact non-invasive temperature measurement even with different pipe diameters.

Furthermore, at least one recess can be formed in a region of the heat coupling element facing the pipe. The recess is suitable for the passage of a fastener, such as a strap, a chain or a clamp. As a result, the fastener can pass through the heat coupling element close to the wall of the pipe, thus enabling simplified installation in which tilting of the heat coupling element is counteracted. In particular, this stabilizes the temperature measuring device during installation. As a result, the disclosed temperature measuring device can be installed quickly and easily, even in a reduced installation space. The at least one recess is, for example, formed in a radially inner axial section of the heat coupling element that is also in direct contact with the wall of the pipe. Furthermore, the recess reduces the volume of the heat coupling element, which in turn accelerates the response of the temperature measuring device.

In addition, the disclosed temperature measuring device can have an end axial section positioned along the heat conduction path downstream of the first and/or second temperature sensor. Herein, the end axial section can be formed as part of the first, second, third, etc. axial section. The end axial section ensures that the heat conduction path passes the first or second temperature sensor substantially free of interference. The impact of edge effects of the heat conduction path, for example, the formation of a heat end at which the heat flow transported along the heat conduction path is released to the environment by convection, is reduced in the regions of the first or second temperature sensor. The further from the first or second temperature sensor the end axial section is located, the more edge effects are minimized. As a result, precise measurement of the temperature of the medium can be realized in a simple manner.

Furthermore, in the disclosed temperature measuring device, the first and/or second temperature sensor can be configured for installation in a radial direction of the pipe. For this purpose, the first or second sensor can be formed as substantially rod-shaped, for example, as a resistance thermometer. The first and/or second temperature sensor can have a first or second measuring pick-up that is attached to a region facing the pipe, in particular at an end of the respective temperature sensor facing the pipe. Here, the first or second measuring pick-up represents the point of the respective temperature sensor that is in direct thermal contact with the heat coupling element. The first and/or second temperature sensor can furthermore be installed through holes in the heat coupling element. This enables stabile installation, simple removal for recalibration and simple replacement of the temperature sensors. Preferably, the first and/or second temperature sensor are each formed as a thin-film resistor offering an advantageous thermal connection to the heat coupling element.

Alternatively, the first and/or second temperature sensor can be installed in an axial direction of the pipe. For this purpose, a hole, in particular a blind hole, extending substantially parallel to the pipe axis can be formed in one of the axial sections of the heat coupling element. For example, the first temperature sensor can be at least partially accommodated in a first axial section and the second temperature sensor can be at least partially accommodated in a second axial section. Due to the fact that the thermal resistance along the heat conduction path through the first and second axial section is extended as a result of the at least sectionally arcuate profile of the heat coupling element, increased measuring accuracy is also provided with such a structure. Consequently, the heat coupling element in accordance with the disclosed embodiments of the invention enables the implementation of particularly compact temperature measuring devices in the radial direction.

The objects and advantages in accordance with the invention are also achieved by a temperature measuring system that is configured to measure a temperature of a medium in a pipe and that has a temperature measuring device connected to an evaluation unit. The evaluation unit is configured to receive and evaluate at least one measured temperature value from the temperature measuring device. The evaluation unit can be accommodated in a housing attached to the sensor holder. Alternatively or supplementarily, the evaluation unit can also be configured as separate and connected to the temperature measuring device via a communicative data connection. In particular, the evaluation unit can be at least functionally realized in an industrial control system, a host computer and/or a computer cloud. In accordance with the invention, the temperature measuring device is configured in accordance with above-disclosed embodiments. As a result, the technical advantages of the temperature measuring device can be transferred to the temperature measuring system.

Similarly, the objects and advantages are achieved in accordance with the invention by a computer program product that is configured to simulate the operating behavior of a temperature measuring device. For this purpose, the computer program product can comprise instructions which, when executed, simulate the operating behavior of the temperature measuring device.

In particular, the computer program product can be configured to simulate the operating behavior of the temperature measuring device by permanently specifying its structure, i.e., by storing an image of the operating behavior. Alternatively, the operating behavior can also be represented by an abstracted calculation model that is independent of the spatial structure of the temperature measuring device. As a further alternative, the operating behavior can also be ascertained using a combination thereof. In accordance with the invention, the temperature measuring device to be simulated is configured in accordance with one of the above-described embodiments. For the simulation, the computer program product can have a physics module in which the temperature measuring device is mapped and, for example, its electrical or signal behavior can be simulated under adjustable operating conditions. For example, the adjustable operating conditions include a flow rate in the cross section of the pipe, a temperature, a pressure, a viscosity of the medium in the pipe, heat transfer behavior of a wall of the pipe, heat conduction behavior of a heat coupling element, and/or convection behavior. For this purpose, the computer program product can have a data interface via which the corresponding data can be specified via user input and/or other simulation-oriented computer program products. The computer program product can also have a data interface for outputting simulation results to a user and/or other simulation-oriented computer program products. The computer program product can, for example, be used to check the plausibility of measured temperature values of temperature sensors from the temperature measuring device or other sensor values of a system in which the temperature measuring device is to be used. As a result, inter alia, this enables a defective sensor, in particular a temperature sensor of the temperature measuring device, to be identified. The invention is also, inter alia, based on the surprising finding that the method outlined above can be modeled with increased precision with relatively little computational effort, for example, heat conduction behavior in the heat coupling element. Accordingly, the computer program product in accordance with the invention provides a comprehensive and, at the same time, computing-capacity-saving option for monitoring and/or trialing a corresponding temperature measuring device. The computer program product can be formed as a "digital twin", such as described in more detail in the publication US 2017/286572 A1, the contents of which are incorporated herein by reference in their entirety. The computer program product can be formed as monolithic, i.e., as completely executable on a hardware platform. Alternatively, the computer program product can be formed as modular and can comprise a plurality of subprograms that can be executed on separate hardware platforms and interact via a communicative data link. In particular, the computer program product can be formed as executable in a computer cloud. Furthermore, the computer program product in accordance with the invention can be used to trial and/or optimize a temperature measuring device by simulation, such as in the case of a planned retrofit in a system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail in the following with reference to individual embodiments in figures. The figures are to be read as complementary to one another in that the same reference symbols have the same technical meaning in different figures. The features of the individual embodiments can also be combined with one another. Furthermore, the embodiments shown in the figures can be combined with the features outlined above, in which:

FIG. 1 is a schematic partially sectional side view of a structure of a first embodiment of the inventive temperature measuring device;

FIG. 2 is a detailed view of a heat coupling element of the first embodiment of the inventive temperature measuring device of FIG. 1; and FIG. 3 a detailed cross-sectional view of a second embodiment of the inventive temperature measuring device.

DETAILED DESCRIPTION OF THE EXEMPLARY EMBODIMENTS

FIG. 1 is a schematic partially sectional side view of a first embodiment of the temperature measuring device 10 in accordance with the invention. The temperature measuring device 10 is installed on a pipe 12 that has a diameter 13 and in which a medium 14 is located. The pipe 12 extends along a pipe axis 15 that also defines an axial direction 19. A radial direction 18 is defined perpendicular to the axial direction 19. The temperature 17 of the medium 14 is to be acquired by the temperature measuring device 10. The temperature measuring device 10 has a heat coupling element 20 that is detachably fastened to a wall 16 of the pipe 12 by fasteners 31. Here, the fasteners 31 are formed as clamps. A sensor holder 30 in which a first and a second temperature sensor 32, 34 are accommodated is attached to the heat coupling element 20. The first and second temperature sensor 32, 34 are each formed as substantially rod-shaped resistance thermometers with a measuring pick-up 33, 35 at their ends. The first measuring pick-up 33 enables the first temperature sensor 32 to acquire a temperature at a point in the heat coupling element 20 and the second measuring pick-up 35 enables the second temperature sensor 34 to acquire a temperature at another point in the heat coupling element 20. Furthermore, a housing 40 in which an evaluation unit 42 is accommodated is arranged on the sensor holder 30. Together with the temperature measuring device 10, the housing 40 with the evaluation unit 42 forms a temperature measuring system 50. The evaluation unit 42 is coupled to the first and second temperature sensor 32, 34 and is configured to receive a first measured temperature value 41 or a second measured temperature value 43 from these and to process and evaluate them to ascertain the temperature 17 of the medium 14. Here, the first measured temperature value 41 corresponds to the temperature at the first measuring pick-up 33 and the second measured temperature value 43 corresponds to the temperature at the second measuring pick-up 35.

The temperature 17 prevailing in the medium 14 causes a heat flow 45 from the wall 16 of the pipe 12 into the heat coupling element 20. The heat flow 45 enables measured temperature values 41, 43, which differ from one another, to be acquired via the first and second temperature sensor 32, 34. The temperature 17 of the medium 14 can be ascertained based on the different measured temperature values 41, 43. The heat coupling element 20 has a substantially Z-shaped or S-shaped profile 29 through which the heat flow 45 is directed through the heat coupling element 20. The Z-shaped or S-shaped profile 29 achieves increased measuring accuracy when ascertaining the temperature 17 of the medium 14. The operating behavior of the temperature measuring device 10 can be simulated by a computer program product 60 which is substantially formed as a digital twin of the temperature measuring device 10.

The heat coupling element 20 from the embodiment in FIG. 1 is illustrated in detail in FIG. 2. The heat coupling element 20 is positioned on a wall 16 of the pipe 12 so that a heat flow 45 occurs from the wall 16 into the heat coupling element 20. From the wall 16, the heat flow 45 enters a second axial section 24 of the heat coupling element 20 that is in thermally conductive contact with the wall 16. Recesses 21 suitable for the fastening means 31, as shown in FIG. 1, are formed in the second axial section 24. The second axial section 24 merges into a first axial section 22 in the radial direction 18. The first and the second axial section 22, 24 are separated from one another by a stepped separating gap 23. Similarly, a transition is formed between the first axial section 22 and a third axial section 26, where the first axial section 22 is likewise separated from the third axial section 26 by a stepped separating step 23. This forms a substantially Z-shaped or S-shaped profile 29 of the heat coupling element 20. As a result, a substantially axial heat conduction path 47 is imposed on the heat flow 45 in the second axial section 24. At the transition from the second axial section 24 into the first axial section 22, the heat flow 45 is in turn deflected, and thus also the heat conduction path 47. The transition between the first and the second axial section 22, 24 forms an arc shape that follows the heat conduction path 47. In first axial section 22, the heat conduction path 47 extends substantially in the axial direction 19. In the first axial section 22, the direction of the heat conduction path 47, symbolized by arrows in FIG. 2, is opposite to that in the second axial section 24. Accordingly, there is a reversal 25 of the heat conduction path 47 between the first and second axial section 22, 24. Similarly, there is also a reversal 25 of the heat conduction path 47 at a transition from the first axial section 22 into the third axial section 26. The heat flow 45 moves away from the wall 18 along the heat conduction path 47 in the radial direction 18, but herein extends in the alternating axial direction 19. As a result, the heat conduction path 47 is extended by the profile 29 of the heat coupling element 20. The separating gaps 23 are filled with an insulator, in particular air, so that heat transfer by convection from the second axial section 24 into the first axial section 22 or from the first axial section 22 into the third axial section 26 is substantially negligible.

Holes 27 extending substantially in the radial direction 18 are formed in the heat coupling element 20. The holes 27 can each accommodate the first or second temperature sensor 32, 34, as illustrated in FIG. 1. The hole 27 intended to accommodate the first temperature sensor 32 ends as a blind hole in the first axial section 22. In the installed state, the first measuring pick-up 33 at the first temperature sensor 32 is consequently in thermally conductive contact with the first axial section 22 of the heat coupling element 20. The hole 27 intended to accommodate the second temperature sensor 34 ends as a blind hole in the second axial section 24. In the installed state, the second measuring pick-up 35 at the second temperature sensor 34 is in thermally conductive contact with the second axial section 24. The heat flow 45 that reaches the second measuring pick-up 35, therefore also reaches the first measuring pick-up 33.

The heat coupling element 20 is made of stainless steel. As a result of the profile 29 of the heat coupling element 20, there is a defined heat conduction path 47 between the first measuring pick-up 33, i.e., the first temperature sensor 32, and the second measuring pick-up 35, i.e., the second temperature sensor 34. As a result, the temperature 17 of the medium 14, as illustrated in FIG. 1, can be ascertained with increased precision. The deflection 25 from the first axial section 22 into the third axial section 26 causes the heat flow 45, and thus the heat conduction path 47, to be further directed in the axial direction 19. As a result, end effects of the heat conduction path 47 are present in a region of an end axial section 38 of the third axial section 26. This also ensures a defined heat conduction path 47 in the region of the first measuring pick-up 33. The operating behavior of the heat coupling element 20 shown in FIG. 2, which includes propagation of the heat flow 45, and thus the shape of the heat conduction path 47, can be simulated in its operating behavior in a computer program product 60. For this purpose, the computer program product 60 is substantially formed as a digital twin of the temperature measuring device 10 that comprises the heat coupling element 20 in FIG. 2.

FIG. 3 depicts a cross section of a heat coupling element 20 in accordance with a second embodiment of the invention. The heat coupling element 20 belongs to a temperature measuring device 10 installed on a wall 16 of a pipe 12. The pipe 12 is filled with a medium 14 the temperature 17 of which is to be acquired with the temperature measuring device 10. In a second axial section 24, the heat coupling element 20 has a substantially central recess 28 on a side 28 facing the pipe 12. Two support sections 37 via which the heat coupling element 20 is supported on the wall 16 are formed by the recess 28. The support sections 37 each establish a thermally conductive contact between the heat coupling element 20 and the wall 16. The support sections 37 each form the thermally conductive contact with the wall 16 via line contact 49. Thus, a heat flow 45 from the wall 16 into the heat coupling element 20 occurs via the line contacts 49. This ensures a substantially constant contact surface, even in the case of different pipe diameters 13. Furthermore, the heat coupling element 20 can be easily installed on pipes 12 with different diameters 13 via the substantially central recess 36. The recess 36 causes the side 28 facing the pipe 12 to be embodied as a dovetail 39. For this purpose, the recess 36 has a substantially trapezoidal profile. As a result, the disclosed temperature measuring device 10 can be attached quickly to different pipes 12 during the course of retrofitting. When the heat coupling element 20 is reinstalled on the wall 16, the thermal impacts of a displacement of the heat coupling element 20 relative to its previous position are minimized. In particular, the heat coupling element 20 can be reinstalled without recalibration. The operating behavior of the temperature measuring device 10, which also includes the heat flow 45 from the wall 16 into the heat coupling element 20, can be simulated by a computer program product 60 (not shown in further detail), which is substantially formed as a digital twin of the temperature measuring device 10.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements that perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A temperature measuring device for non-invasively measuring a temperature of a medium in a pipe, comprising:
   a first temperature sensor;
   a sensor holder; and
   a heat coupling element configured to produce a heat conduction path from a wall of the pipe to a first temperature sensor, said heat coupling element being configured to provide a first measured temperature value;
   wherein characterized in that the heat coupling element has an arcuate profile at least sectionally for adjusting the heat conduction path to axially reverse the heat conduction path; and
   wherein the axial reversal relates to an axial direction which is defined by a direction in which the pipe extends.

2. The temperature measuring device as claimed in claim 1, wherein the heat coupling element is formed in a layered configuration with components composed of different materials for adjusting the heat conduction path.

3. The temperature measuring device as claimed in claim 2, wherein the heat coupling element has one of a C-shaped profile, an S-shaped profile, a Z-shaped profile or a meander profile.

4. The temperature measuring device as claimed in claim 2, wherein the temperature measuring device has a second temperature sensor.

5. The temperature measuring device as claimed in claim 1, wherein the heat coupling element has one of a C-shaped profile, an S-shaped profile, a Z-shaped profile or a meander profile.

6. The temperature measuring device as claimed in claim 5, wherein the temperature measuring device has a second temperature sensor.

7. The temperature measuring device as claimed in claim 1, wherein the temperature measuring device has a second temperature sensor.

8. The temperature measuring device as claimed in claim 7, wherein the first temperature sensor is arranged in a first axial section of the heat coupling element to acquire a first measured temperature value and the second temperature sensor is arranged in a second axial section of the heat coupling element to acquire a second measured temperature value.

9. The temperature measuring device as claimed in claim 1, wherein the heat coupling element is at least partially made of a material which has a temperature-related thermal conductivity gradient value of up to 0.025 (W/(m*K))/° C.

10. The temperature measuring device as claimed in claim 9, wherein the material is stainless steel.

11. The temperature measuring device as claimed in claim 1, wherein a side of the heat coupling element facing the pipe is formed as a dovetail.

12. The temperature measuring device as claimed claim 1, wherein a recess for passage of a fastener is formed in a region of the heat coupling element facing the pipe.

13. The temperature measuring device as claimed in claim 1, wherein the heat coupling element has an end axial section positioned along the heat conduction path downstream of at least one of the first and second temperature sensor.

14. The temperature measuring device as claimed in claim 1, wherein at least one of the first and second temperature sensors are installable in a radial direction of the pipe.

15. The temperature measuring device as claimed in claim 1, wherein at least one of at the first and second temperature sensor is installable in an axial direction of the pipe.

16. A temperature measuring system, comprising:
   a temperature measuring device which is coupled to an evaluation unit;
   wherein the temperature measuring device is configured as claimed in claim 1.

17. A computer program product for simulating an operational behavior of a temperature measuring device installed on a pipe for measuring a temperature of a medium located therein; wherein the temperature measuring device is configured as claimed in claim 1 and the computer program product is formed as a digital twin of the temperature measuring device.

* * * * *